Oct. 2, 1962 G. DIEMER ET AL 3,056,887

OPTRONIC SHIFT REGISTER

Filed Sept. 29, 1960 2 Sheets-Sheet 1

INVENTORS

BY

AGENT

INVENTORS
Gesinus Diemer
Simon Duinker
Edward F. de Haan
Johannes G. van Santen
BY
Frank R. Jufari
AGENT United States Patent Office 3,056,887

Patented Oct. 2, 1962

3,056,887

OPTRONIC SHIFT REGISTER

Gesinus Diemer, Simon Duinker, Edward Fokko de Haan, and Johannes Gerrit van Santen, all of Eindhoven, Netherlands, assignors to North American Philips Company, Inc., New York, N.Y., a corporation of Delaware Filed Sept. 29, 1960, Ser. No. 59,282

Claims priority, application Netherlands Oct. 2, 1959

5 Claims. (Cl. 250—208)

Figure 1:
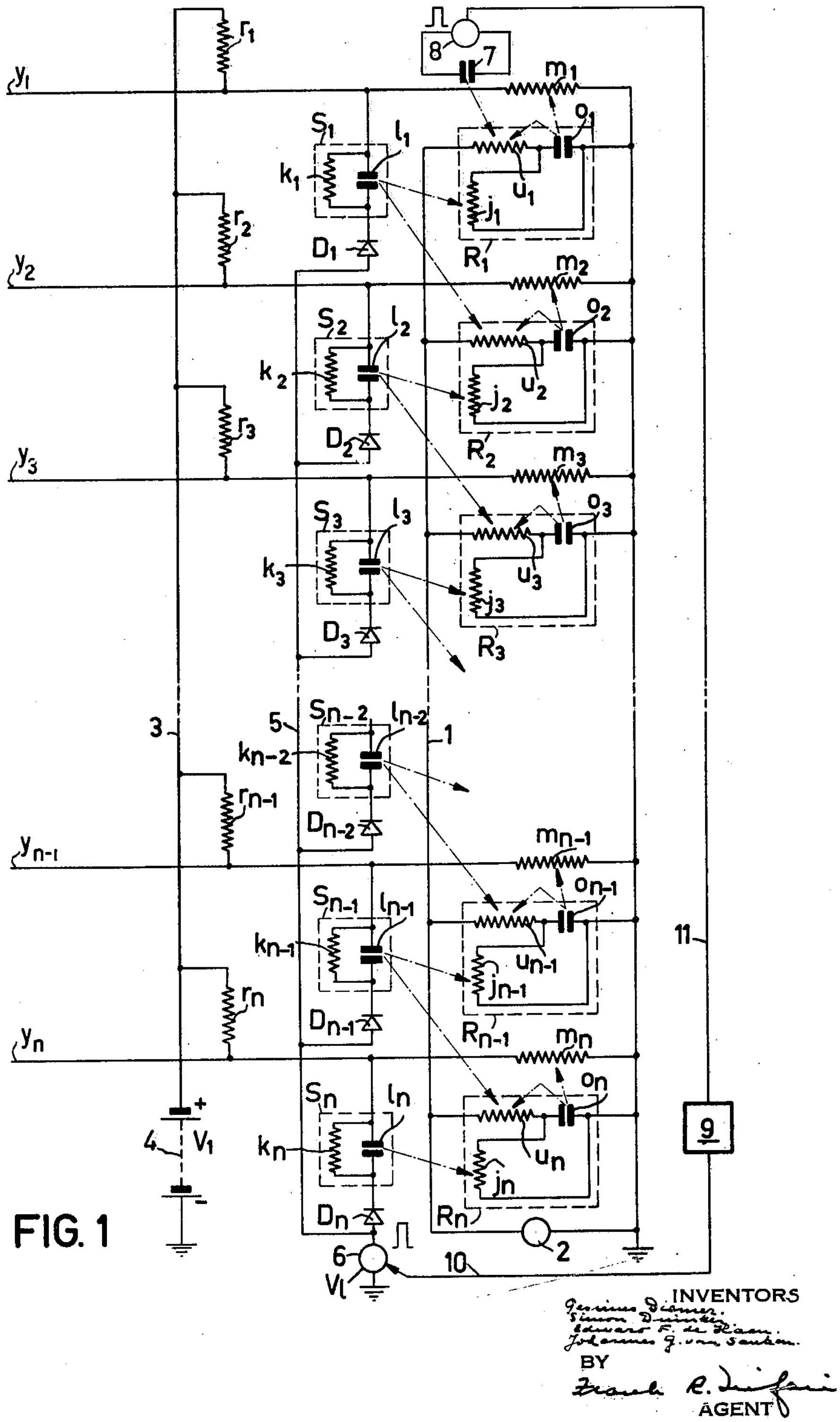

(1) The invention relates to an optronic shift register, i.e., one composed of electro-luminescent cells and photo-resistors. It may be considered as comprising two sections, the first of which is formed by $n$ storage circuits, activated by a common source and being in an "on"-condition or an "off"-condition. The first storage circuit is triggered into the on-condition by information pulses and each storage circuit comprises the series combination of a first photo-resistor and an electro-luminescent cell, the produced radiation of the cell striking the photo-resistor; each storage circuit further comprises a second photo-resistor connected in parallel with the electro-luminescent cell. The second section is formed partially by $n$ electro-luminescent cells which supply the quenching-starting pulses for the storage circuits, also included in the second section are associated circuit elements.

(2) Such a shift register is known from the article "Opto-electronic Devices and Networks," of E. E. Loebner, in Proc. of the I.R.E., vol. 43, No. 12 of December 1955, pages 897 to 1906. FIG. 14 on page 1905 of the article shows such a shift register.

In the shift register of the article, the control by means of the electro-luminescent cells of the second section is very complicated. In addition, these cells can be controlled only by means of switches which are alternately actuated.

The object of the present invention is to provide an optronic shift register of the foregoing kind which is reliable in operation and relatively simple in its control arrangements.

(3) The invention includes a slightly modified arrangement of the elements of the first section, and provides a simple solution for the control of the storage circuits of the first section by quench-start pulses emanating from the second section.

(4) According to the invention, the shift register is characterized in that the second section comprises $n$ series combinations of one fixed resistor and one variable photo-resistor, each series combination being coupled with a corresponding storage circuit; these are connected in parallel with the terminals of a direct-voltage source; the radiation of an electro-luminescent cell of a storage circuit strikes the photo-resistor of one of the series combination of the second section. The second section also comprises $n$ unilaterally conductive elements, each of which has one end connected through a common conductor to a third source supplying the shift pulses to the second section; the unilaterally conductive elements are also connected via the electro-luminescent cells of the second section to the junctions of the series-connected resistors, said elements being arranged so that a particular one becomes conductive only when the corresponding storage circuit is in the on-condition.

Figure 2:
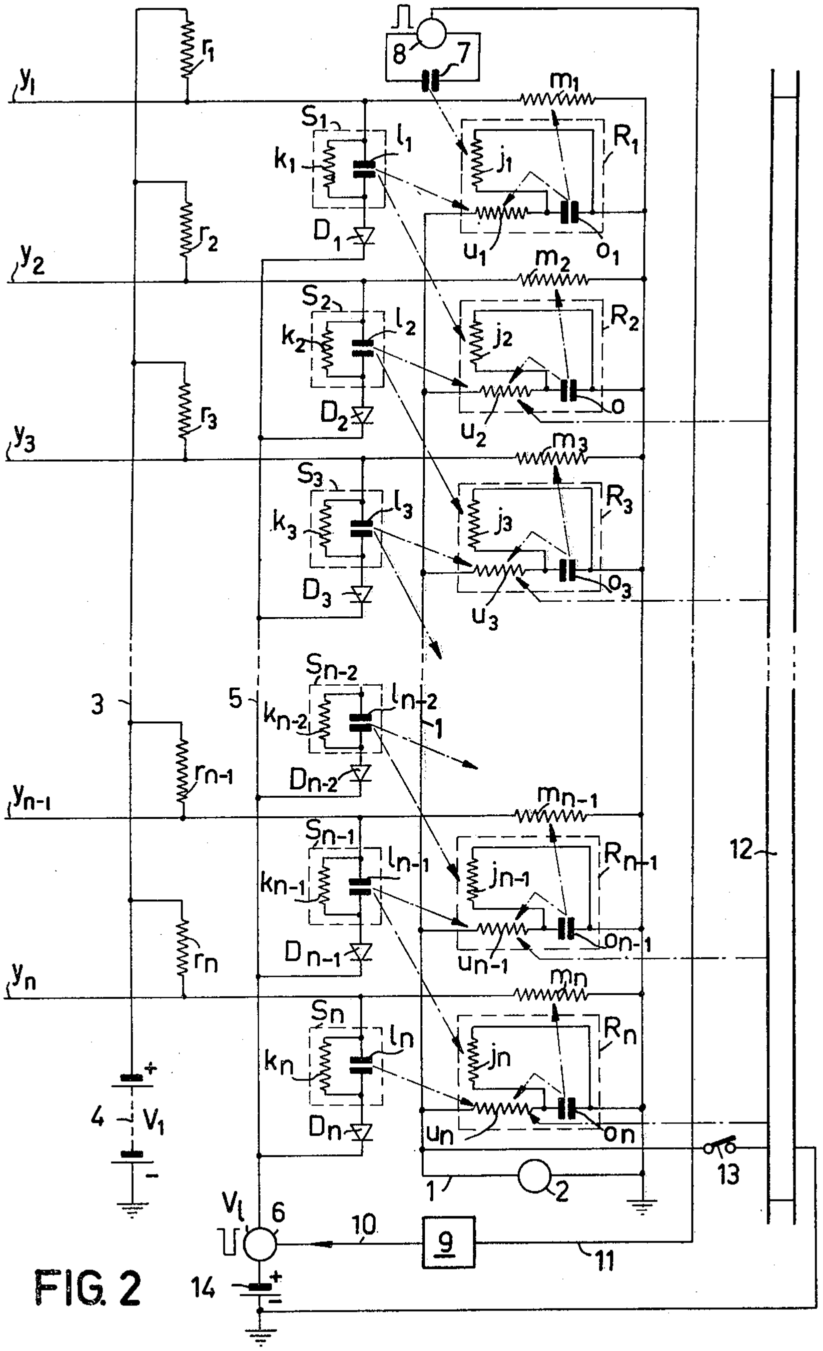

(5) A few potential embodiments of the shift register according to the invention will now be described more fully by way of example with reference to the accompanying drawings in which:

(6) FIG. 1 shows a shift register in which the on-condition of a storage circuit corresponds to the condition in which the electro-luminescent cell associated with this storage circuit produces a radiation and (7) FIG. 2 shows a shift register in which the on-condition of a storage circuit corresponds to the condition in which the electro-luminescent cell associated with this storage circuit does not produce a radiation.

(8) As shown in FIG. 1, the circuits $R_1$ to $R_n$ represent the storage circuits of the first section. Each storage circuit consists of the series combination of a first photo-resistor $u$ and an electro-luminescent cell $o$, of which the radiation is directed to the resistor $u$ and of a second photo-resistor $j$, connected in parallel with the electro-luminescent cell $o$. The terminals of all these series-parallel combinations are connected via a common conductor 1 to the activating source 2, which supplies the required energy for the $n$ storage circuits.

(9) To these $n$ storage circuits are added the $n$ series combinations of the second section, each consisting of two resistors $r$ and $m$, which series combinations are connected on the one hand via the common conductor 3 to the direct-voltage source 4, which supplies a positive voltage of $V_1$ volts, and on the other hand to earth. The resistors $r$ are fixed, non-variable resistors, for example, carbon resistors, of which the ends remote from the resistors $m$ are connected to the common conductor 3. The resistors $m$ are photo-resistors, which are exposed to the radiation emanating from the electro-luminescent cells $o$, however in such a way that an electro-luminescent cell $o$ is capable of illuminating only a photo-resistor of the series combination added thereto.

(10) The foregoing is indicated by the dot-and-dash arrows of FIG. 1. For example, the electro-luminescent cell $o_1$ of the storage circuit $R_1$ illuminates the photo-resistors $m_1$ and $u_1$, when this storage circuit is in the on-condition. The same applies to the further circuits.

(11) To the junctions of the resistors $r$ and $m$ are connected the control-devices $S_1$ to $S_n$.

(12) To these control-devices $S_1$ to $S_n$ are connected the cathodes of unilaterally conductive elements $D_1$ to $D_n$, of which the anodes are connected to the common conductor 5, which is connected to a generator 6. This generator 6 supplies the shift pulses $V_L$, which are to energize one or more of the phosphor elements $l_1$ to $l_n$ of the control-devices $S_1$ to $S_n$. An element $l$, however, can be energized only when the storage circuit added to the series combination of the resistors $r$ and $m$, to the junction of which is connected the electro-luminescent element $l$, is in the on-condition.

(13) The shift register operates as follows:

A separate electro-luminescent cell 7, which is energized from the source 8, triggers the first storage circuit $R_1$ into the on-condition, since when the source 8 supplies a pulse, the cell 7 is caused to luminesce. The radiation of this element strikes the photo-resistor $u_1$, so that the resistance value of this resistor is reduced to an extent such that the voltage across the element $o_1$ becomes so high that this element starts luminescing. This radiation strikes the resistors $m_1$ and $u_1$, so that the resistance value of $m_1$ is considerably reduced and that of $u_1$ is held at such a low value that the element $o_1$ continues emitting radiation. This on-condition is maintained until a shift pulse $V_1$ emanating from the generator 6 causes the element $l_1$ to luminesce. This is possible, since the unilaterally conductive element $D_1$ is in the conductive state. The direct-voltage source 4 supplies a positive voltage of $V_1$ to the conductor 3. Since the resistor $r_1$ has a fixed resistance value and the resistance value of the resistor $m_1$ has been considerably reduced, the junction of the resistors $r_1$ and $m_1$ will be substantially at earth potential, whereas the potential at the junction of the further resistors $r$ and $m$ has approximately a value of $V_1$ volts.

(14) The shift pulse $V_L$ supplied to all the unilaterally conductive elements D thus produces only a current through the device $S_1$, since only the diode $D_1$ is conductive. This may be accounted for as follows: It is assumed that the resistance value of a resistor $m$, in the non-illuminated state, is $m_h$ ohms and in the illuminated condition $m_1$ ohms. If the resistance value of the fixed resistor $r$ is equal to $r$ ohms, the voltage $V_y$ at a junction of resistors $r$ and $m$ is found to be $$V_y=\frac{m_h}{r+m_h}\cdot V_1 \text{ volts}$$

if the resistor $m$ is not illuminated, and a potential of:

$$V_y'=\frac{m_1}{r+m_1}\cdot V_1 \text{ volts}$$

if the resistor $m$ is illuminated.

It is supposed the $m_h=10^6$ ohms and $m_1=10^2$ ohms and that resistance value of $r$ is $10^4$ ohms; then $V_y$ and $V_y'$ are found to be:

$$V_y=\frac{10^6}{10^4+10^6}\cdot V_1=\frac{100}{101}\cdot V_1 \text{ volts}$$

and $$V_y'=\frac{10^2}{10^4+10^2}\cdot V_1=\frac{1}{101}\cdot V_1 \text{ volts}$$

If the voltage source 4 supplies a voltage $V_1$ of 500 volts, this means that the potential at the junction of the resistors $r$ and $m$ is substantially equal to +500 v., if the resistor $m$ is not illuminated, and is substantially equal to +5 v. to earth, if the resistor $m$ is illuminated.

The radiation of the element $l_1$, which is caused to light in the manner described above, strikes the resistor $j_1$ of the circuit $R_1$ and the resistor $u_2$ of the circuit $R_2$. Since the resistor $j_1$ is re duced, the voltage across the element $o_1$ will drop to an extent such that this element extinguishes, so that the radiation for the resistors $u_1$ and $m_1$ vanishes. At the same time the resistance value of the resistor $u_2$ is strongly reduced so that the element $o_2$ is caused to luminesce. The radiation of this element strikes the resistors $u_2$ and $m_2$, so that on the one hand the potential at the junction of the resistors $r_2$ and $m_2$ approaches earth potential and on the other hand the element $o_2$ continues to luminesce.

A new condition is obtained, in which the storage circuit $R_1$ is in the off-condition and the storage circuit $R_2$ is in the on-condition.

In order to ensure a smooth performance of the change-over it may be necessary to connect in parallel with the electro-luminescent element $l_1$ a fixed resistor $k_1$. The parallel combination of the element $k_1$ and $l_1$ determines the time constant of the control-device $S_1$. A charge produced by the pulse $V_L$ on the element $l_1$, formed as a capacitor, is adapted to leak away in a time determined by the network $k_1$, $l_1$ and this time must be such that, when the element $l_1$ extinguishes, the new condition for the storage circuits $R_1$ and $R_2$ has been obtained. Since an electro-luminescent element has, by its nature, a certain amount of parallel resistance, it is in many cases not necessary to provide a resistor $k_1$, since the natural parallel resistance suffices to obtain the aforesaid effect. The same applies, of course, to the resistors $k_2$ to $k_n$ of the further control-devices $S_2$ to $S_n$.

If the element 7 does not supply new information pulses, each next-following pulse $V_L$ will trigger a further storage circuit R into the on-condition and thus ensure that the supplied information shifts along the register.

It will be evident that, if for example, the storage circuit $R_3$ is in the on-condition and if then a pulse is supplied by the generator 8, so that also the storage circuit $R_1$ is triggered into the on-condition, the two unilaterally conductive elements $D_1$ and $D_3$ will be in the conductive state. A further following pulse $V_L$ will cause both the elements $l_1$ and the element $l_3$ to luminesce, so that the storage circuits $R_1$ and $R_3$ are moved into the off-condition and the storage circuits $R_2$ and $R_4$ into the on-condition. In this way any desired information may be supplied via the source 8 to the shift register, this information being caused to shift in place, whilst during one cycle a plurality of storage circuits may be in the on-condition and/or a plurality of these circuits may be in the off-condition. One cycle is to be understood to mean herein the period in which an information supplied to the storage circuit $R_1$ arrives at the storage circuit $R_n$ and then disappears.

The information shifting along the register may be derived in two ways. This information may be derived in the form of voltages from the conductors $y_1$ to $y_n$ which are connected to the junctions of the resistors $r$ and $m$ or use may be made to this end of the radiation of the elements $o$, since in the on-condition the potential at the junction of the added resistors $r$ and $m$ will be low and at the same time the electro-luminescent element $o$ will produce radiation.

In order to ensure that the supply of the information takes place after the shift pulses $V_L$ have brought about a new adjustment of the storage circuits, the generators 6 and 8 are to be governed from a common source 9. The source 9 is, to this end, connected on the one hand via the conductor 10 to the generator 6 and on the other hand via the conductor 11 to the generator 8.

A second control-method is illustrated in FIG. 2. In this figure, in which corresponding parts are designated as far as possible by corresponding references as in FIG. 1, the storage circuits $R_2$ to $R_n$ are triggered into the off-condition from a separate radiation source 12 during the switching-on of the shift register. This is achieved by closing the switch 13 for a short instant simultaneously with switching-on of the shift register. Thus the radiation source 12 is energized for a short instant from the source 2, so that the radiation produced by the said source strikes the resistors $u_2$ to $u_n$. Thus the elements $o_2$ to $o_n$ will be caused to luminesce and since the radiation of these elements is directed towards the associated resistors $u$ and $m$, the resistance value thereof is reduced. All elements $o_2$ to $o_n$ thus continue to luminesce and the junctions of the resistors $r_2$, $m_2$ to $r_n$, $m_n$ will be at a low potential to earth.

The unilaterally conductive elements $D_1$ to $D_n$ are connected with their anodes to the devices $S_1$ to $S_n$ and with their cathodes to the common conductor 5, which is connected to earth via the generator 6 and the separate direct-voltage source 14. The direct-voltage source 14 supplies a positive bias voltage for the unilaterally conductive elements D. The aforesaid junctions, which are connected via the control-devices $S_2$ to $S_n$ to the unilaterally conductive elements $D_2$ to $D_n$, are approximately at earth potential, so that these unilaterally conductive elements are blocked. Only the unilaterally conductive element $D_1$, which is connected via the device $S_1$ to the junction between the resistor $r_1$ and $m_1$ which is on a high potential, is in the conductive state.

If, for example, the positive bias voltage of the source 14 is chosen to be +200 v., whilst, as stated above, the potential at the junction of the resistors $r_1$ and $m_1$ in the non-illuminated state of $m_1$ is about +500 v., only the unilaterally conductive element $D_1$ will be conductive at the occurrence of the first shift pulse $V_L$, if this negative-going pulse has an amplitude of −150 v. The further junctions are at a potential of about +5 v. to earth, so that they are blocked by the bias voltage of +200 v.

The arrangement shown in FIG. 2 operates approximately like that of FIG. 1, but the radiation of an electro-luminescent element $l$ is directed, on the one hand, to the first photo-resistor $u$ of the storage circuit R, to which the series combination of the resistors $r$ and $m$ is added, and to which the electro-luminescent element $l$ concerned is connected, and on the other hand, to the second photo-resistor of the storage circuit R, following the former.

In the initial state the storage circuit $R_1$ is in the on-condition and the further circuits are in the off-condition. The first information pulse, occurring after this initial state and emanating from the electro-luminescent element 7, does therefore not produce a change-over of the state of the storage circuit $R_1$. The first next-following shift pulse $V_L$ encounters a conductive element $D_1$, so that the element $l_1$ is caused to luminesce and the resistors $u_1$ and $j_2$ are strongly reduced in value. Consequently, the element $o_1$ luminesces and the element $o_2$ extinguishes. In the new state the circuit $R_1$ is in the off-condition and $R_2$ is in the on-condition. Also in this case the information shifts along the shift register and it will be obvious that, when a new information pulse is supplied by the element 7 the storage circuit $R_1$, which is in the off-condition, is triggered by this information pulse into the on-condition, after which the shift pulses $V_L$ ensure that this information shifts further along the register.

The information shifting along the register is preferably derived from the conductors $y_1$ to $y_n$ connected to the junctions of the resistors $r$ and $m$, since in the on-condition the elements $o$ do not produce radiation.

It will be obvious that the polarity of the direct-voltage source 4 may be reversed. In this case also the unilaterally conductive elements D are to be reversed, which also applies to the direct-voltage source 14. As a matter of fact, the shift pulses $V_L$ must have the opposite sign.

The elements 7, $o$ and $l$ and the radiation source 12 may be manufactured from zinc sulphide (ZnS), activated with $10^{-3}$ copper (Cu) and $9.10^{-4}$ aluminium (Al) atoms per molecule ZnS. The photo-resistors $j$, $u$ and $m$ may be composed of cadmium sulphide (CdS), activated with $2.10^{-4}$ gallium (Ga) and $1.9.10^{-4}$ copper (Cu) atoms per molecule CdS.

What is claimed is:

1. An optronic shift register comprising two sections, the first section being formed by $n$ storage circuits, activated from a common source and being in the on-condition or in the off-condition, the first storage circuit being triggered by information pulses into the on-condition, each storage circuit comprising a series combination of a first photo-resistor and an electro-luminescent cell, and a second photo-resistor connected in parallel with the electro-luminescent cell, the radiation produced by said cell being directed on the first photo-resistor, the second section comprising $n$ electro-luminescent cells supplying the quench-start pulses for the storage circuits, said second section comprising $n$ series resistor combinations of one fixed resistor and one variable photo-resistor, said $n$ series resistor combinations being connected in parallel with the terminals of a direct-voltage source, each series resistor combination being coupled with an associated storage circuit, the radiation of the electro-luminescent cells of said storage circuits being directed on the photo-resistors of the associated series resistor combinations, said second section also comprising $n$ unilaterally conductive elements all of which have one end connected through a common conductor to a third source supplying the shift pulses to the second section, the other ends of the unilaterally conducting elements being coupled through the $n$ electro-luminescent elements of the second section to the junctions of said series-connected fixed resistors and variable photo-resistors, said unilaterally conducting elements being arranged so that a particular one becomes conductive only when the corresponding storage circuit is in the on-condition.

2. An optronic shift register as claimed in claim 1, wherein the radiation produced by each electro-luminescent cell of the second section is directed on said second parallel-connected photo-resistor of the associated storage circuit and also on said first series-connected photo-resistor of the next-following storage circuit.

3. An optronic shift register as claimed in claim 1, wherein the radiation produced by each electro-luminescent cell of the second section is directed on said second parallel-connected photo-resistor of the associated storage circuit and also on said first series-connected photo-resistor of the next-following storage circuit, said information pulses being obtained from a separate electro-luminescent cell, the radiation from said cell being directed on the first series-connected photo-resistor of the first storage circuit.

4. An optronic shift register as claimed in claim 1, further comprising a first separate electro-luminescent source whose radiation is directed to all the first photo-resistors of said storage circuits, the radiation from each electro-luminescent cell of the second section being directed on the first series-connected photo-resistor of the associated storage circuit and on the second parallel-connected photo-resistor of the next-following storage circuit, said information pulses being obtained from a second separate electro-luminescent cell, the radiation from said second separate cell being directed on the second parallel-connected photo-resistor of the first storage circuit.

5. An optronic shift register as claimed in claim 4, further comprising means for momentarily activating said first separate cell when the shift register is switched on.

References Cited in the file of this patent

UNITED STATES PATENTS

| | | |
|---|---|---|
| 2,727,683 | Allen et al. | Dec. 20, 1955 |
| 2,985,763 | Ress | May 23, 1961 |